US010808785B2

(12) United States Patent
Mages

(10) Patent No.: US 10,808,785 B2
(45) Date of Patent: Oct. 20, 2020

(54) BELLOWS ASSEMBLY AND BELLOWS FOR VEHICLES

(71) Applicants: THYSSENKRUPP BILSTEIN GMBH, Ennepetal (DE); thyssenkrupp AG, Essen (DE)

(72) Inventor: Stefan Mages, Hürth (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/317,113

(22) PCT Filed: Jul. 12, 2017

(86) PCT No.: PCT/EP2017/067580
§ 371 (c)(1),
(2) Date: Jan. 11, 2019

(87) PCT Pub. No.: WO2018/011282
PCT Pub. Date: Jan. 18, 2018

(65) Prior Publication Data
US 2019/0242451 A1 Aug. 8, 2019

(30) Foreign Application Priority Data

Jul. 12, 2016 (DE) .................. 10 2016 212 686

(51) Int. Cl.
*F16F 1/12* (2006.01)
*F16J 3/04* (2006.01)
*F16F 9/38* (2006.01)

(52) U.S. Cl.
CPC .............. *F16F 1/128* (2013.01); *F16J 3/04* (2013.01); *F16J 3/041* (2013.01); *F16F 9/38* (2013.01);
(Continued)

(58) Field of Classification Search
CPC .............. F16F 1/128; F16F 2230/105; F16F 2230/0023; F16F 9/38; F16J 3/04; F16J 3/041
See application file for complete search history.

(56) References Cited

U.S. PATENT DOCUMENTS 3,141,660 A 7/1964 Clarke
3,572,676 A * 3/1971 Yew .................. B60G 11/58
267/34
(Continued)

FOREIGN PATENT DOCUMENTS

DE 22 55 070 5/1974
DE 29 13 022 10/1980
(Continued)

OTHER PUBLICATIONS

English Translation of International Search Report issued in PCT/EP2017/067580, dated Sep. 19, 2017.

*Primary Examiner* — Pamela Rodriguez
(74) *Attorney, Agent, or Firm* — thyssenkrupp North America, LLC

(57) ABSTRACT

A bellows assembly for a vibration damper includes a bellows with a plurality of pockets with pocket walls and a pocket inner profile, a helical compression spring with windings consisting of a wound spring wire and pressure contact lateral faces. The helical compression spring is arranged in the bellows and the plurality of pockets extend coaxially to the longitudinal axis of the helical compression spring. Under pressure loading of the helical compression spring arranged in the bellows, the bellows folds together with the helical compression spring, wherein the wound spring wire is arranged at least in certain portions in the plurality of pockets, wherein the pocket walls of the plurality of pockets in which the wound spring wire is arranged at least in certain portions cover at least the mutually opposite pressure contact lateral faces of adjacent windings of the helical compression spring.

14 Claims, 2 Drawing Sheets

(52) U.S. Cl.
CPC . *F16F 2230/0023* (2013.01); *F16F 2230/105* (2013.01)

(56) References Cited

U.S. PATENT DOCUMENTS

| | | | | |
|---|---|---|---|---|
| 3,795,390 A | * | 3/1974 | Kendall | B60R 19/26 |
| | | | | 267/33 |
| 4,817,921 A | * | 4/1989 | Stevenson | B60G 11/52 |
| | | | | 248/621 |
| 4,886,256 A | * | 12/1989 | Nishiyama | B60G 11/52 |
| | | | | 267/221 |
| 4,957,277 A | * | 9/1990 | Paton | F16F 1/422 |
| | | | | 267/152 |

FOREIGN PATENT DOCUMENTS

| | | |
|---|---|---|
| DE | 31 39 193 A | 4/1982 |
| DE | 10 2008 053 617 A | 5/2010 |
| DE | 10 2013 218 711 A | 3/2015 |
| JP | S58 43813 A | 3/1983 |
| JP | H03 113188 A | 5/1991 |
| JP | 2005-265 040 A | 9/2005 |
| WO | 97/07999 A | 3/1997 |
| WO | 98/26193 A | 6/1998 |

\* cited by examiner

BELLOWS ASSEMBLY AND BELLOWS FOR VEHICLES

CROSS REFERENCE TO RELATED APPLICATIONS

This application is a U.S. National Stage Entry of International Patent Application Serial Number PCT/EP2017/067580, filed Jul. 12, 2017, which claims priority to German Patent Application No. DE 10 2016 212 686.5, filed Jul. 12, 2016, the entire contents of both of which are incorporated herein by reference.

FIELD

The present disclosure generally relates to a bellows assembly and a bellows for vehicles.

BACKGROUND

Bellows assemblies and bellows are known in a large number of design forms in the prior art. In bellows assemblies, bellows are customarily arranged as a protector around the piston rod of a vibration damper. The helical (compression) spring of a suspension strut is often, apart from its coating, exposed unprotected to environmental influences. Particularly in the case of progressive, i.e. nonlinear, helical (compression) springs in which the progressivity is achieved by placing individual windings on one another, high pressure on the contact surfaces of the helical (compression) springs causes damage to the surfaces which during further use can lead to corrosion and as a result to component failure. A protection against surface damage on pressure contact lateral faces of helical compression springs by means of bellows is not known in the prior art. Moreover, assemblies known in the prior art are generally noise-sensitive since vibrations are generated by the metallic contact of the windings at the contact faces (surfaces), which vibrations may be perceived under some circumstances as acoustically disturbing, in particular in the passenger cell.

A bellows is known from DE102008053617A1.

Thus a need exists for a bellows assembly to better protect helical compression springs against corrosion and as far as possible avoid surface damage, in particular on pressure contact lateral faces. Furthermore, noise which is caused in particular by winding contact of helical compression springs is intended to be reduced as far as possible.

DETAILED DESCRIPTION

Figure 1:
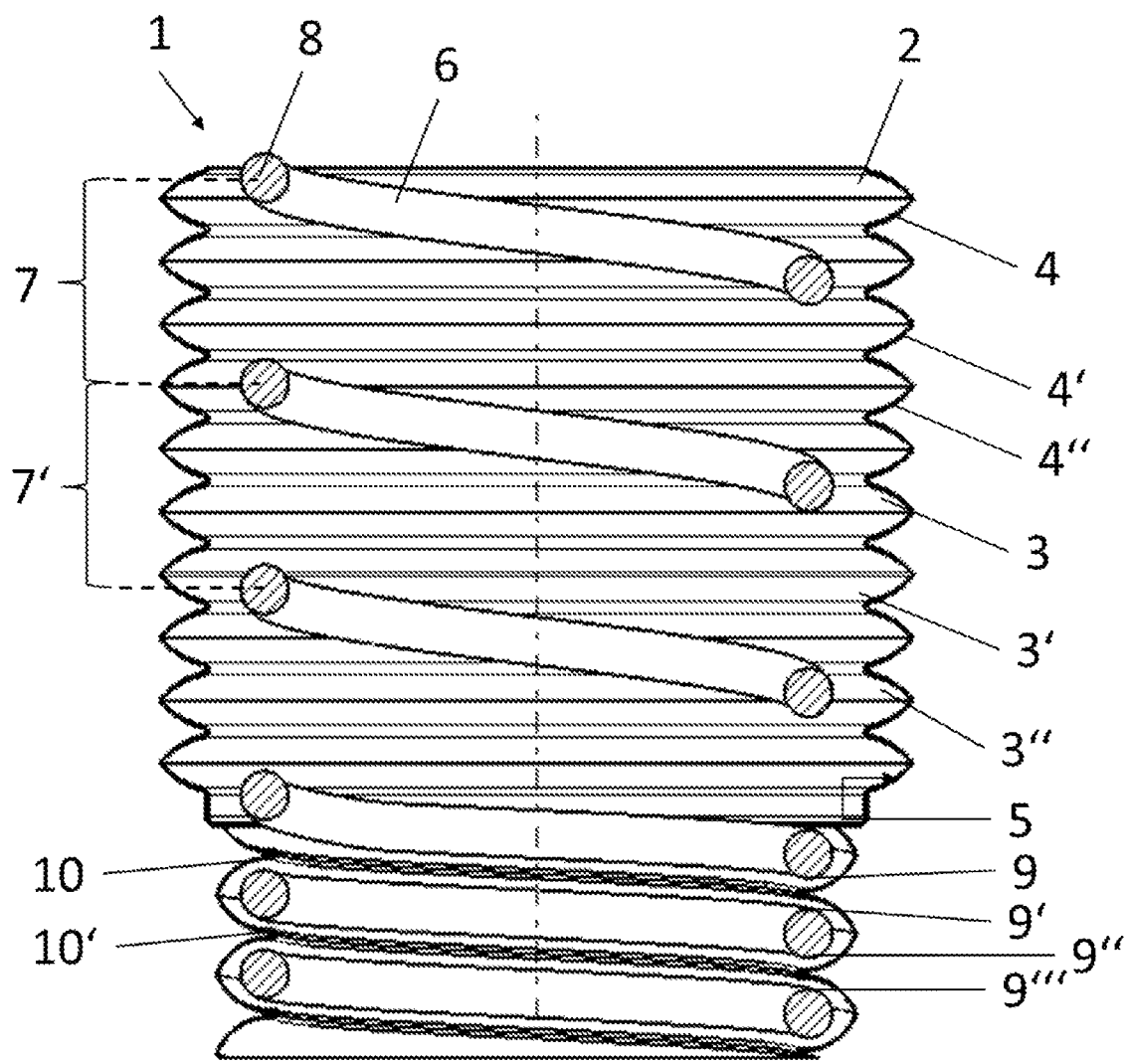
FIG. 1 is a schematic view of a longitudinal section of a bellows assembly according to one embodiment of the invention.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a bellows assembly and a bellows for vehicles.

By contrast with conventional bellows assemblies, the bellows assembly according to the invention has the advantage that winding contacts of helical compression springs are avoided as far as possible under pressure loading. It is advantageous that, as a result, surface damage to the helical compression springs, and also resulting disturbing noise which can be perceived in particular in the passenger compartment, are avoided as far as possible, which also makes the helical compression springs less susceptible to corrosion.

By contrast with conventional bellows, the bellows according to the invention has the advantage that, when it is arranged on the helical compression spring, it is positionally stable, i.e. slips in particular only to a minor extent on the helical compression spring.

The subject of the invention is therefore a bellows assembly for a vibration damper, comprising a bellows with a plurality of pockets with pocket walls and a pocket inner profile, a helical compression spring with windings consisting of a wound spring wire and pressure contact lateral faces, wherein the helical compression spring is arranged in the bellows and the plurality of pockets extend coaxially to the longitudinal axis of the helical compression spring and, under pressure loading of the helical compression spring arranged in the bellows, the bellows folds together with the helical compression spring, wherein the wound spring wire is arranged at least in certain portions in the plurality of pockets, wherein the pocket walls of the plurality of pockets in which the wound spring wire is arranged at least in certain portions cover at least the mutually opposite pressure contact lateral faces of adjacent windings of the helical compression spring.

A further subject of the invention is a bellows for arranging on a helical compression spring with windings consisting of a wound spring wire according to a bellows assembly, the bellows comprising a plurality of pockets with pocket walls and a pocket inner profile, wherein the plurality of pockets are formed in such a way that a wound spring wire can be arranged at least in certain portions in the plurality of pockets, wherein the pocket walls of the plurality of pockets are formed in such a way that, with complete or partial folding of the bellows, the adjacent pocket walls at least partially contact one another.

In some examples, a vibration damper for vehicles may have a bellows assembly, comprising a bellows with a plurality of pockets with pocket walls and a pocket inner profile, a helical compression spring with windings consisting of a wound spring wire and pressure contact lateral faces, wherein the helical compression spring is arranged in the bellows and the plurality of pockets extend coaxially to the longitudinal axis of the helical compression spring and, under pressure loading of the helical compression spring arranged in the bellows, the bellows folds together with the helical compression spring, wherein the wound spring wire is arranged at least in certain portions in the plurality of pockets, wherein the pocket walls of the plurality of pockets in which the wound spring wire is arranged at least in certain portions cover at least the mutually opposite pressure contact lateral faces of adjacent windings of the helical compression spring, wherein the pocket walls of the plurality of pockets are arranged in such a way that, under complete or partial pressure loading of the helical compression spring, the mutually opposite pressure contact lateral faces of adjacent windings of the helical compression spring do not contact one another.

The present invention can be realized in a bellows assembly, a bellows and a vibration damper having a bellows assembly.

In the context of the present invention, a pressure contact lateral face is understood to mean the lateral face(s) of a helical compression spring which contact one another under pressure loading. For example, these are mutually opposite lateral faces of adjacent windings of a helical compression spring which contact one another under pressure loading.

According to a further embodiment of the invention, the pocket walls of the plurality of pockets are arranged in such a way that, under complete or partial pressure loading of the helical compression spring, the mutually opposite pressure contact lateral faces of adjacent windings of the helical compression spring do not contact one another.

In a further embodiment of the invention, the pocket walls of adjacent pockets of the plurality of pockets in which the wound spring wire is arranged at least in certain portions space apart at least the wound spring wire in the region of the pressure contact lateral faces of adjacent windings of the helical compression spring.

In the context of the present invention, the term "space apart" is understood to mean that the pressure contact lateral face(s) of adjacent windings of a helical compression spring do not directly contact one another since pocket walls are arranged between the pressure contact lateral face(s).

According to a further embodiment of the invention, the pocket walls of the plurality of pockets in which the wound spring wire is arranged at least in certain portions extend, in the region of the lateral face of the wound spring wire arranged at least in certain portions in the plurality of pockets, at least radially beyond half the cross section of the wound spring wire in the direction of the longitudinal axis of the helical compression spring.

According to a further embodiment of the invention, the adjacent pocket walls of the plurality of pockets in which extend at least radially beyond half the cross section of the wound spring wire in the direction of the longitudinal axis of the helical compression spring form a loop. Examples of a loop, in particular its geometric configuration, can be a round arc loop, an omega loop, a pointed arc loop or a combination thereof. The geometry of the loop, such as the loop size or the loop circumference, for example, can change in particular under pressure loading of the helical compression spring arranged in the bellows assembly.

According to a further embodiment of the invention, the pocket inner profile is a pointed arc profile.

In a further embodiment of the invention, the pocket inner profile is a round arc profile, in particular an elliptical arc, a circular arc or a combination thereof.

According to a further embodiment of the invention, the pocket inner profile is formed in such a way that the pocket walls, with the exception of the loops, lie on the outer radius of the wound spring wire arranged at least in certain portions in the plurality of pockets.

According to a further embodiment of the invention, the plurality of pockets of the bellows are formed as a thread, in particular formed as an internal thread, at least in subregions, wherein the helical compression spring is screwed into the thread.

In a further embodiment of the invention, the thread has the same pitch as the windings of the helical compression spring in the construction position.

Within the context of the present invention, construction position is understood to mean that the helical compression spring is loaded purely statically by the nonmoving (vehicle) weight.

FIG. 1 shows a schematic longitudinal section of a bellows assembly 1 in the construction position, comprising a bellows 2 and a helical compression spring 6 arranged in the bellows 2. The bellows 2 has a plurality of pockets 3, 3', 3" with pocket walls 4, 4', 4" and a pocket inner profile 5. The pocket inner profile 5 is illustrated by way of example as a pointed arc profile. The helical compression spring 6 comprises windings 7, 7' consisting of a wound spring wire 8 and pressure contact lateral faces 9, 9', 9", 9"'. The plurality of pockets 3, 3', 3" extend coaxially to the helical compression spring 6. The wound spring wire 8 is arranged at least in certain portions in the plurality of pockets 3, 3', 3", wherein the pocket walls 4, 4', 4" of the plurality of pockets 3, 3', 3" in which the wound spring wire 8 is arranged at least in certain portions cover at least the mutually opposite pressure contact lateral faces 9, 9', 9"', 9" of adjacent windings 7, 7' of the helical compression spring 6. The bellows assembly 1 is illustrated as pressure-loaded in the lower region, wherein the pocket walls 4, 4', 4" cover at least the pressure contact lateral faces 9, 9', 9"', 9"' of adjacent windings 7, 7' of the helical compression spring 6, and the adjacent pocket walls 4, 4', 4" extend at least radially beyond half the cross section of the wound spring wire 8 in the direction of the longitudinal axis of the helical compression spring 6 and form a loop 10, 10'. The loop 10, 10' is illustrated by way of example as an arc loop.

Figure 2:
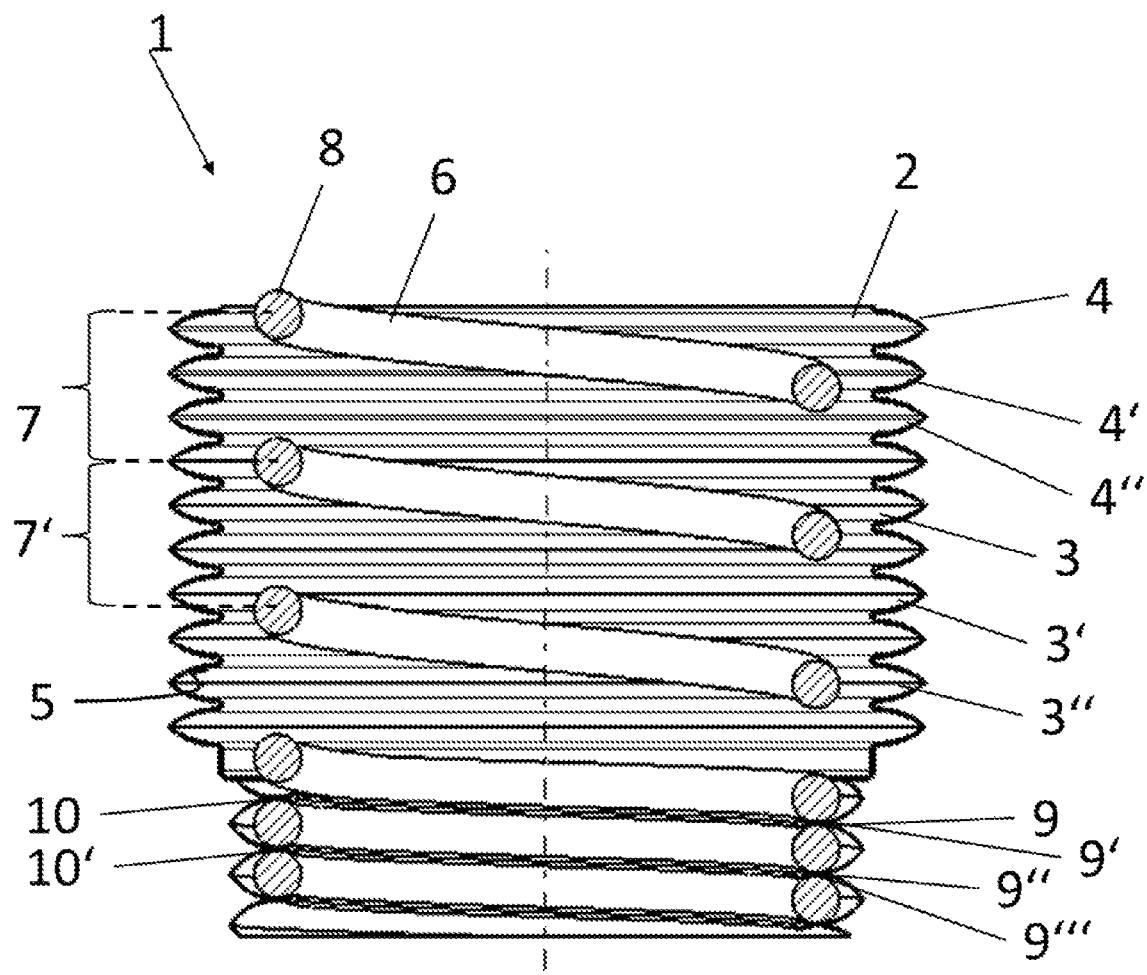
FIG. 2 is a schematic view of a longitudinal section of a bellows assembly according to FIG. 1 in a pressure-loaded state according to one embodiment of the invention.

FIG. 2 illustrates a schematic longitudinal section of the bellows assembly 1 according to FIG. 1 in a pressure-loaded state, i.e. the bellows assembly according to FIG. 1 is sprung in further such that the windings of the progressive region together with the pocket walls arranged between them are situated in the fully compressed state, wherein the pocket walls of the respective pockets are arranged between mutually opposite pressure contact lateral faces of adjacent windings and cover the opposite pressure contact lateral faces of adjacent windings.

INDUSTRIAL APPLICABILITY

Bellows assemblies, bellows and vibration dampers for vehicles having a bellows assembly of the above-described type are used in the production of damping systems, in particular in vibration dampers of motor vehicles.

LIST OF REFERENCE SIGNS

1=Bellows assembly
2=Bellows
3, 3', 3"=Pocket(s)
4, 4', 4"=Pocket wall(s)
5=Pocket inner profile
6=Helical compression spring
7, 7'=Winding(s)
8=Spring wire
9, 9', 9", 9"'=Pressure contact lateral face(s)
10, 10'=Loop

What is claimed is:

1. A bellows assembly for a vibration damper, comprising:
a bellows with a plurality of pockets with pocket walls and a pocket inner profile, and
a helical compression spring arranged in the bellows, the helical compression spring comprising windings having a wound spring wire and pressure contact lateral faces,
wherein the plurality of pockets extends coaxially with a longitudinal axis of the helical compression spring and, under pressure loading of the helical compression spring arranged in the bellows, the bellows is configured to fold together with the helical compression spring,
wherein at least portions of the wound spring wire are arranged in the plurality of pockets, wherein the pocket walls of the plurality of pockets in which the wound spring wire is arranged at least in certain portions cover at least mutually opposite pressure contact lateral faces of adjacent windings of the helical compression spring,
wherein a subset of the plurality of pockets, which is less than all of the plurality of pockets, is configured as a thread into which the helical compression spring is screwed.

2. The bellows assembly of claim 1, wherein the pocket walls of the plurality of pockets are arranged such that, under complete or partial pressure loading of the helical compression spring, the mutually opposite pressure contact lateral faces of adjacent windings of the helical compression spring do not contact one another.

3. The bellows assembly of claim 1, wherein the pocket walls of adjacent pockets of the plurality of pockets in which the wound spring wire is arranged at least in certain portions space apart at least the wound spring wire in the region of the pressure contact lateral faces of adjacent windings of the helical compression spring.

4. The bellows assembly of claim 1, wherein the pocket walls of the plurality of pockets in which the wound spring wire is arranged at least in certain portions extend, in the region of a lateral face of the wound spring wire arranged at least in certain portions in the plurality of pockets, at least radially beyond half a cross section of the wound spring wire in the direction of the longitudinal axis of the helical compression spring.

5. The bellows assembly of claim 4, wherein the adjacent pocket walls of the plurality of pockets in which extend at least radially beyond half the cross section of the wound spring wire in the direction of the longitudinal axis of the helical compression spring form one or more loops.

6. The bellows assembly of claim 5, wherein each of the loops is a round arc loop or an omega loop.

7. The bellows assembly of claim 5, wherein the pocket inner profile is formed in such a way that the pocket walls, with the exception of the loops, lie on an outer radius of the wound spring wire arranged at least in certain portions in the plurality of pockets.

8. The bellows assembly of claim 1, wherein the pocket inner profile is a pointed arc profile.

9. The bellows assembly of claim 1, wherein the pocket inner profile is a round arc profile.

10. The bellows assembly of claim 9, wherein the pocket inner profile is a circular arc.

11. The bellows assembly of claim 1, wherein the thread is formed as an internal thread.

12. The bellows assembly of claim 1, wherein the thread has the same pitch as the windings of the helical compression spring in a construction position.

13. A bellows for arranging on a helical compression spring with windings consisting of a wound spring wire according to the bellows assembly of claim 1, wherein the bellows comprises a plurality of pockets with pocket walls and a pocket inner profile, wherein the plurality of pockets are configured to receive a wound spring wire at least in certain portions in the plurality of pockets, wherein the pocket walls of the plurality of pockets are configured such that, with complete or partial folding of the bellows, the adjacent pocket walls at least partially contact one another.

14. A vibration damper for vehicles, comprising:
a bellows assembly comprising a bellows with a plurality of pockets with pocket walls and a pocket inner profile, and
a helical compression spring arranged in the bellows, the helical compression spring comprising windings having a wound spring wire and pressure contact lateral faces,
wherein the plurality of pockets extends coaxially with a longitudinal axis of the helical compression spring and, under pressure loading of the helical compression spring arranged in the bellows, the bellows is configured to fold together with the helical compression spring,
wherein at least portions of the wound spring wire is arranged in the plurality of pockets, wherein the pocket walls of the plurality of pockets in which the wound spring wire is arranged at least in certain portions cover at least mutually opposite pressure contact lateral faces of adjacent windings of the helical compression spring,
wherein the pocket walls of the plurality of pockets are arranged such that, under complete or partial pressure loading of the helical compression spring, the mutually opposite pressure contact lateral faces of adjacent windings of the helical compression spring do not contact one another,
wherein a subset of the plurality of pockets, which is less than all of the plurality of pockets, is configured as a thread into which the helical compression spring is screwed.

* * * * *